United States Patent
Jang et al.

(10) Patent No.: US 10,025,434 B2
(45) Date of Patent: Jul. 17, 2018

(54) TOUCH SYSTEM, TOUCH PANEL, AND DISPLAY DEVICE

(71) Applicant: LG Display Co., Ltd., Seoul (KR)

(72) Inventors: Hyunwoo Jang, Seoul (KR); Sujin Kwon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 264 days.

(21) Appl. No.: 14/468,533

(22) Filed: Aug. 26, 2014

(65) Prior Publication Data

US 2015/0185935 A1 Jul. 2, 2015

(30) Foreign Application Priority Data

Dec. 27, 2013 (KR) .................. 10-2013-0165343

(51) Int. Cl.
G06F 3/041 (2006.01)
G06F 3/044 (2006.01)

(52) U.S. Cl.
CPC ............ *G06F 3/044* (2013.01); *G06F 3/0416* (2013.01)

(58) Field of Classification Search
CPC ..................... G06F 3/0418; G06F 3/00–3/167
USPC ................................ 178/18.06; 345/173, 174
See application file for complete search history.

(56) References Cited

U.S. PATENT DOCUMENTS

| | | | |
|---|---|---|---|
| 9,337,833 B2 * | 5/2016 | Siska ................. | H03K 17/962 |
| 2010/0188346 A1 | 7/2010 | Yamauchi et al. | |
| 2011/0109591 A1 | 5/2011 | Kurokawa et al. | |
| 2012/0019477 A1 * | 1/2012 | Fujita ................. | G06F 3/045 |
| | | | 345/174 |
| 2012/0133594 A1 | 5/2012 | Edwards et al. | |
| 2013/0113730 A1 | 5/2013 | Lo et al. | |
| 2013/0120310 A1 | 5/2013 | Siska | |
| 2013/0265276 A1 * | 10/2013 | Obeidat ................. | G06F 3/044 |
| | | | 345/174 |

(Continued)

FOREIGN PATENT DOCUMENTS

| | | |
|---|---|---|
| CN | 101788864 A | 7/2010 |
| CN | 102597930 A | 7/2012 |
| CN | 103336644 A | 10/2013 |

(Continued)

OTHER PUBLICATIONS

Taiwanese Office Action dated Jan. 19, 2016, for corresponding Taiwanese Patent Application No. 103135237.

(Continued)

*Primary Examiner* — Amr Awad
*Assistant Examiner* — Aaron Midkiff
(74) *Attorney, Agent, or Firm* — Morgan, Lewis & Bockius LLP

(57) ABSTRACT

A touch system includes a touch panel having first electrodes formed in a first direction, second electrodes formed in a second direction, and driving lines and pre-charge lines connected to respective first electrodes; and a touch IC unit configured to successively apply driving signals to the first electrodes, receive sensing signals through the second electrodes, and, when applying the driving signal to a driving line connected to a first electrode chosen as a driving electrode from the first electrodes, apply a pre-charge signal to a pre-charge line connected to at least one first electrode chosen as a pre-driving electrode from the other first electrodes than the first electrode chosen as the driving electrode.

11 Claims, 16 Drawing Sheets

(56) References Cited

U.S. PATENT DOCUMENTS

2014/0019477 A1 1/2014 Bao et al.
2014/0139480 A1* 5/2014 Seo ...................... G06F 3/0416
345/174

FOREIGN PATENT DOCUMENTS

TW 201222383 A1 6/2012
TW 201319881 A1 5/2013

OTHER PUBLICATIONS

The First Office Action dated Apr. 1, 2017 from The State Intellectual Property Office of the People's Republic of China in counterpart Chinese application No. 201410503475.2.

* cited by examiner

*FIG.2*
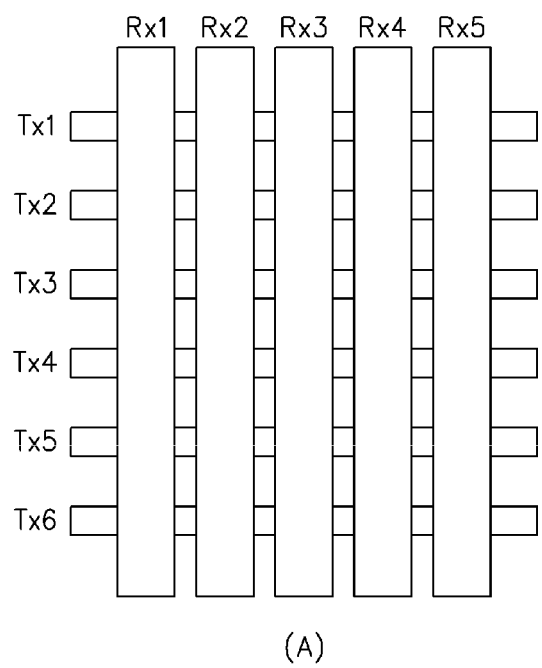
(A)
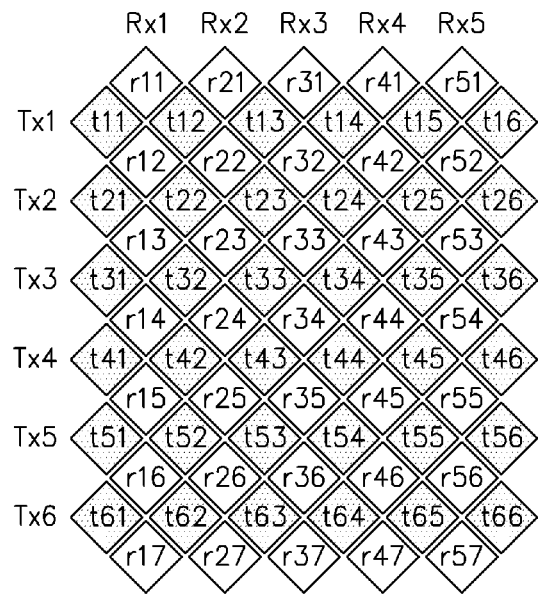
(B)

FIG. 4
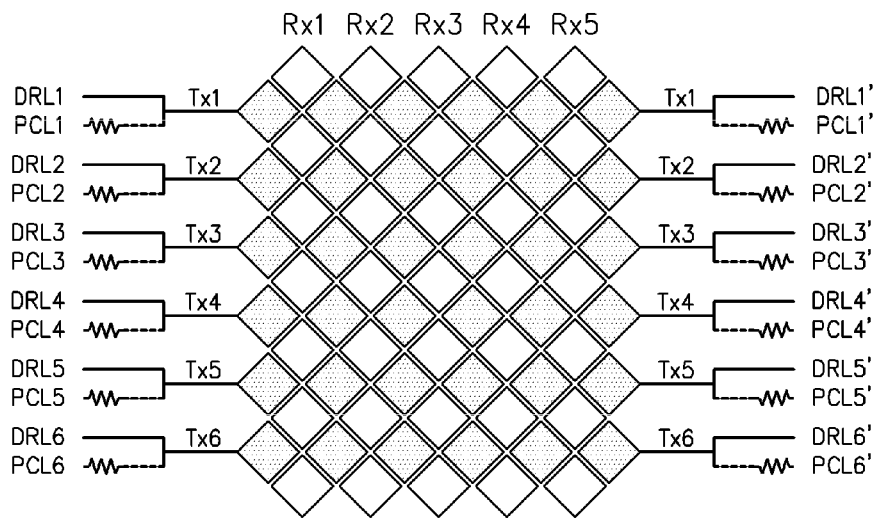
(A)
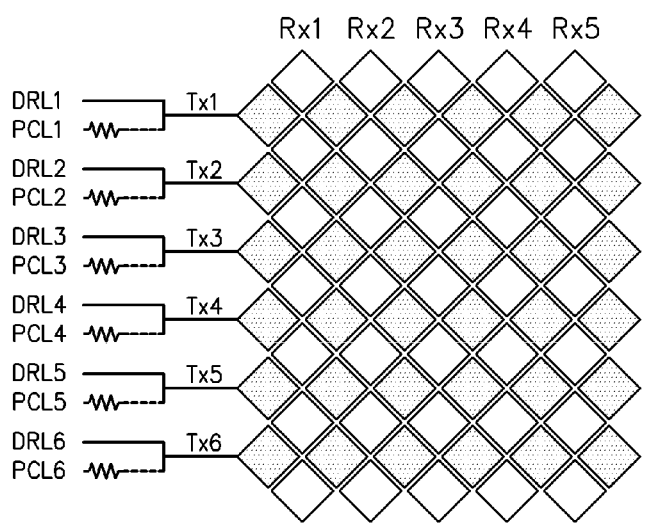
(B)

TOUCH SYSTEM, TOUCH PANEL, AND DISPLAY DEVICE

CROSS-REFERENCE TO RELATED APPLICATION

This application claims the priority of Korean Patent Application No. 10-2013-0165343, filed on Dec. 27, 2013, which is hereby incorporated by reference for all purposes as if fully set forth herein.

BACKGROUND OF THE INVENTION

Field of the Invention

The present invention relates to a touch system, a touch panel, and a display device.

Description of the Related Art

With the development of information society, various types of requirements for a display device for displaying an image are increasing and, recently, various display devices, such as a Liquid Crystal Display (LCD), a Plasma Display Panel (PDP), and an Organic Light Emitting Diode Display Device (OLED), are being used.

Recently, a growing number of such display devices have moved away from related art input schemes using buttons, keyboards, mouses, etc. towards touch-based input schemes, which enable users to input information or commands intuitively and conveniently.

To provide such a touch-based scheme, a display device requires a touch system capable of accurately detecting the coordinate of a point touched by the user.

Related art touch systems employ a number of touch schemes, such as a resistive scheme, a capacitive scheme, an electromagnetic induction scheme, an infrared scheme, an ultrasonic scheme, etc., the capacitive scheme being most widely employed.

According to a related art capacitive touch scheme, two kinds of electrodes are arranged on a touch panel in different directions, driving signals are successively applied to electrodes arranged in one direction, sensing signals are sensed from electrodes arranged in the other direction, and touch coordinates are detected based on the sensed sensing signals.

However, accurate detection of touch coordinates requires, according to the related art capacitive touch scheme, that good sensing signals having strong resistance to noise be obtained.

Therefore, touch systems employing the related art capacitive touch scheme apply high-voltage driving signals, in order to increase SNR (Signal to Noise Ratio), or repeat driving and sensing a number of times.

However, high-voltage driving to obtain high SNR increases power consumption. Such an increase in power consumption resulting from high-voltage driving worsens in the case of touch panels having a large area, and may even pose serious problems to display devices, power consumption of which is a sensitive issue, such as mobile terminals.

Furthermore, an increased number of repeated driving and sensing for the purpose of obtaining high SNR has a problem in that too much time is taken before actually calculating touch coordinates, i.e. the report rate is low, so that detection of touch coordinates takes a long time.

SUMMARY OF THE INVENTION

Accordingly, the present invention is directed to a touch system, a touch panel, and a display device that substantially obviates one or more of the problems due to limitations and disadvantages of the related art.

An object of the present invention is to provide a touch system, a touch panel, and a display device capable of accurate touch sensing even with low-voltage driving.

Another object is to provide a touch system, a touch panel, and a display device capable of accurate touch sensing even with a reduced number of repeated driving and sensing.

Another object is to provide a touch system, a touch panel, and a display device capable of reducing power consumption for touch sensing.

Another object is to provide a touch system, a touch panel, and a display device capable of increasing the touch sensing rate.

Additional features and advantage of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch system includes a touch panel having first electrodes formed in a first direction, second electrodes formed in a second direction, and driving lines and pre-charge lines connected to respective first electrodes; and a touch IC unit configured to successively apply driving signals to the first electrodes, receive sensing signals through the second electrodes, and, when applying the driving signal to a driving line connected to a first electrode chosen as a driving electrode from the first electrodes, apply a pre-charge signal to a pre-charge line connected to at least one first electrode chosen as a pre-driving electrode from the other first electrodes than the first electrode chosen as the driving electrode.

In another aspect, a touch panel includes first electrodes formed in a first direction; second electrodes formed in a second direction; and driving lines and pre-charge lines connected to respective first electrodes. When a driving signal is applied to a driving line connected to one first electrode of the first electrodes, the driving signal is simultaneously applied to a pre-charge line connected to a different first electrode.

In another aspect, a display device includes a touch panel having first electrodes formed in a first direction, second electrodes formed in a second direction, and driving lines and pre-charge lines connected to respective first electrodes; and at least one touch IC unit configured to successively apply driving signals to the first electrodes, respectively, receive sensing signals through the second electrodes, and, when applying the driving signal to a first electrode chosen from the first electrodes, apply the driving signal to at least one different first electrode.

In another aspect, a display device includes at least two touch panels having first electrodes formed in a first direction, second electrodes formed in a second direction, and driving lines and pre-charge lines connected to respective first electrodes; a first touch IC unit configured so that, when simultaneously applying driving signals to first electrodes chosen from the first electrodes formed on the at least two touch panels, respectively, the driving signal is simultaneously applied to at least one different first electrode formed on each of the at least two touch panels; and at least two second IC units provided at the at least two touch panels, respectively, and configured to receive sensing signals through second electrodes formed on corresponding touch panels.

In another aspect, a display device includes at least two touch panels having first electrodes formed in a first direction, second electrodes formed in a second direction, and driving lines and pre-charge lines connected to respective first electrodes; and at least two touch IC units provided at the at least two touch panels, respectively, to operate independently and configured so that, when applying a driving signal to a first electrode chosen from first electrodes formed on a corresponding touch panel, the driving signal is simultaneously applied to at least one different first electrode formed on the corresponding touch panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrates embodiments of the invention and together with the description serve to explain the principles of the invention. In the drawings:

FIGS. 2A and 2B illustrate exemplary touch electrodes formed on touch panels of touch systems according to an embodiment.

FIGS. 4A and 4B illustrate basic structures for pre-driving in touch systems according to an embodiment.

DETAILED DESCRIPTION OF THE EMBODIMENTS

Figure 1:
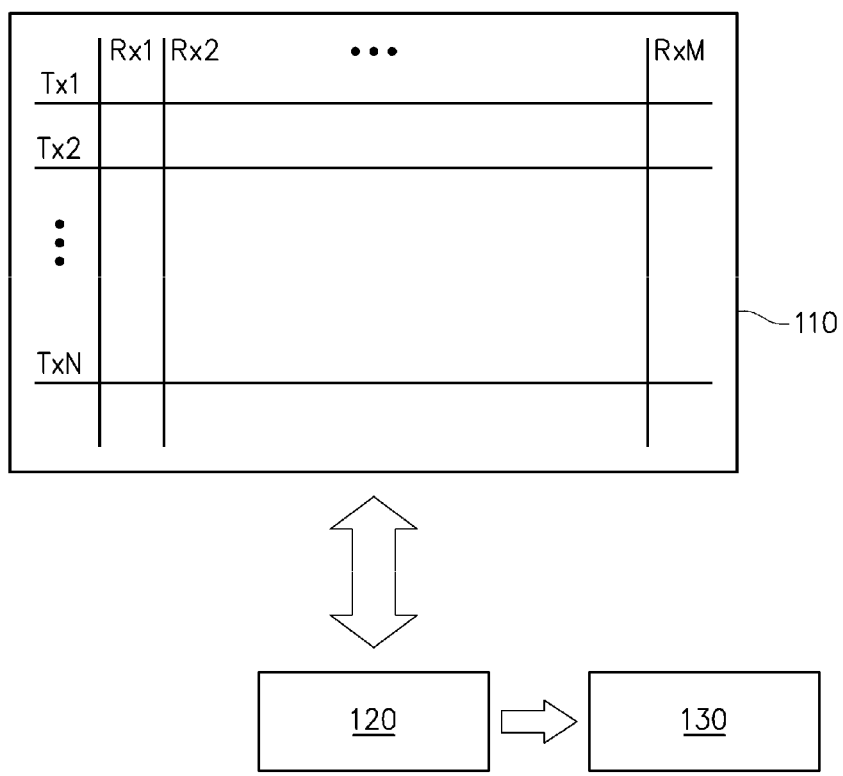
FIG. 1 illustrates a schematic construction of a touch system according to an embodiment.

Reference will now be made in detail to the preferred embodiments of the present invention, examples of which are illustrated in the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 illustrates a schematic construction of a touch system 100 according to an embodiment.

With reference to FIG. 1, the touch system 100 according to an embodiment includes a touch panel 110, a touch IC unit 120, and the like.

The touch panel 110 has first electrodes Tx1-TxN formed in a first direction and second electrodes Rx1-RxM formed in a second direction.

The touch panel 110 has as many as N first electrodes Tx1-TxN and as many as M second electrodes Rx1-RxM formed in intersecting directions, thereby defining as many as N*N sensor nodes. For example, intersection of Tx2 and Rx3 defines sensor node (2, 3), and intersection of Tx5 and Rx7 defines sensor node (5, 7).

The touch IC unit 120 is configured to successively apply DRSs (DRiving Signals) to the first electrodes Tx1-TxN, i.e. successively drive the first electrodes Tx1-TxN, and receive sensing signals for respective sensor nodes through the second electrodes Rx1-RxM.

The touch IC unit 120 may transmit sensing data, which includes sensing signals sensed with regard to respective sensor nodes, to a controller 130. In this case, the sensing signals sensed with regard to respective sensor nodes may be voltage information regarding respective sensor nodes or capacitance information.

In addition, the touch IC unit 120 may include one touch IC or at least two touch ICs. In this case, each touch IC includes a driving IC (Tx IC) and a sensing IC (Rx IC).

The controller 130 is configured to execute a touch algorithm based on sensing data received from the touch IC unit 120 and detect touch coordinates.

Meanwhile, the touch sensors (first electrodes, second electrodes) of the touch panel 110 will be described in more detail: the first electrodes Tx1-TxN, which are formed on the touch panel 110 in a first direction, are touch electrodes to which DRSs are applied, and may also be referred to as Tx electrodes. The second electrodes Rx1-RxM, which are formed on the touch panel 110 in a second direction that intersects with the first direction, are touch electrodes by which sensing signals are sensed, and may also referred to as "Rx electrodes".

The first electrodes Tx1-TxN and the second electrodes Rx1-RxM may have various forms.

In addition, the first electrodes Tx1-TxN and the second electrodes Rx1-RxM may be formed on the same layer or on different layers, respectively.

Exemplary formations of the first electrodes Tx1-TxN and the second electrodes Rx1-RxM are illustrated in FIGS. 2A and 2B.

FIGS. 2A and 2B illustrate exemplary touch electrodes formed on the touch panel 110 of the touch system 100 according to an embodiment. It is assumed in FIGS. 2A and 2B, for convenience of description, that N=6 and M=5.

With reference to FIG. 2A, each of the first electrodes Tx1-Tx6 has the shape of an integral bar, and each of the second electrodes Rx1-Rx5 has the shape of an integral bar. In this case, the first electrodes Tx1-Tx6 and the second electrodes Rx1-Rx5 may be formed on the same layer.

With reference to FIG. 2B, each of the first electrodes Tx1-Tx6 may include at least two first sub-electrodes t11-t16, t21-t26, . . . , t61-t66 connected to one another, and each of the second electrodes Rx1-Rx5 may also include at least two second sub-electrodes r11-r17, r21-r27, . . . , r51-r57 connected to one another. In this case, the first electrodes Tx1-Tx6 and the second electrodes Rx1-Rx5 may be formed on the same layer or on different layers, respectively.

Meanwhile, as described above, the touch IC unit 120 successively drives the first electrodes Tx1-TxN, i.e. successively applies DRSs to the first electrodes Tx1-TxN, and receives sensing signals from the second electrodes as a result of driving of respective first electrodes. Touch coordinates are detected based on sensing signals received in this manner.

Meanwhile, accurate detection of touch coordinates requires that good sensing signals having strong resistance to noise be obtained.

Therefore, related art touch systems apply high-voltage DRSs, in order to increase SNR, or repeat driving and sensing a number of times.

However, high-voltage driving to obtain high SNR increases power consumption. Such an increase of power consumption resulting from high-voltage driving worsens in the case of a touch panel 110 having a large area, and may even pose serious problems to display devices, power consumption of which is a sensitive issue, such a mobile terminals.

Furthermore, an increased number of repeated driving and sensing for the purpose of obtaining high SNR has a problem in that too long time is taken before actually calculating touch coordinates, i.e. the report rate is low, so that detection of touch coordinates takes a long time.

Considering this, the present application discloses a driving method capable of providing a high SNR without performing high-voltage driving and without increasing the accumulated number of driving and sensing performed, as well as a structure for the same.

A pre-driving method provides a driving method capable of providing a high SNR without performing high-voltage driving and without increasing the accumulated number of driving and sensing performed.

Figure 3:
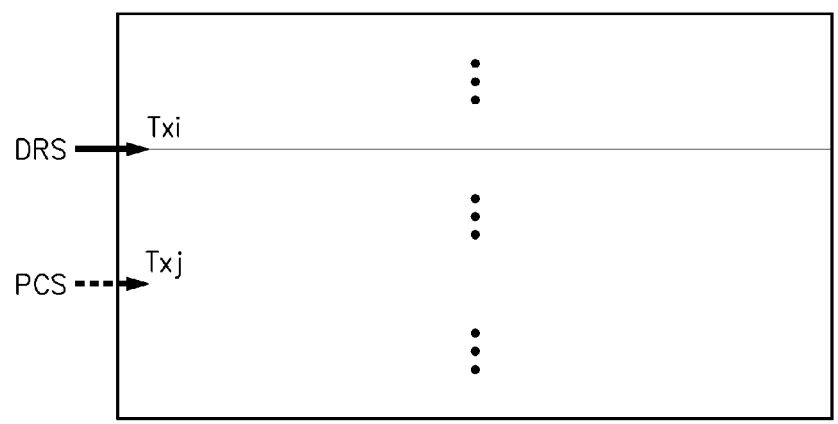
FIG. 3 illustrates pre-driving in a touch system according to an embodiment.

The "pre-driving", as proposed, means that, when a first electrode (driving electrode) is being driven according to a successive driving order among first electrodes Tx1-TxN as illustrated in FIG. 3, at least one different first electrode (pre-driving electrode) is driven together. Such pre-driving will be described again with reference to FIG. 3.

FIG. 3 illustrates pre-driving in a touch system according to an embodiment.

With reference to FIG. 3, pre-driving is as follows: when a DRS is applied to a first electrode Tx1, which has been chosen as a driving electrode among first electrodes Tx1-TxN according to a successive driving order, a PCS (Pre-Charge Signal) is also applied to at least one different first electrode Txj, which has been chosen as a pre-driving electrode.

In this case, the PCS applied to at least one different first electrode Txj, which has been chosen as a pre-driving electrode, may be the same as the DRS applied to the first electrode Txi that has been chosen as a driving electrode.

In this case, the voltage of the DRS and the PCS may be, for example, 5V or less.

According to the pre-driving scheme, a PCS is applied in advance to a first electrode, which is to be driven actually later, and which is thereby charged up to a predetermined voltage, so that it becomes unnecessary to apply a high-voltage DRS when actually driving the first electrode, to which the PCS has been applied. Therefore, application of the pre-driving scheme can drive the first electrodes Tx1-TxN using a low voltage without degrading the SNR.

According to the pre-driving scheme, furthermore, applying a PCS in advance to a first electrode, which is to be driven actually later, can reduce the accumulated number of repeated driving and sensing operations, thereby increasing the touch sensing rate accordingly.

Meanwhile, the pre-driving can be divided into "single pre-driving", according to which only one pre-driving electrode is driven in advance when one driving electrode is driven, and "multi-pre-driving", according to which at least two pre-driving electrodes are driven in advance.

A basic structure for such pre-driving will be described with reference to FIGS. 4A and 4B.

FIGS. 4A and 4B illustrate a basic structure for pre-driving in a touch system 100 according to an embodiment.

With reference to FIGS. 4A and 4B, a touch system 100 according to an embodiment has, for the purpose of pre-driving, DRLs (DRiving Lines) and PCLs (Pre-Charge Lines) connected to first electrodes Tx1-TxN, respectively, and formed on the touch panel 110.

FIG. 4A illustrates a basic structure for applying a "double routing scheme", according to which DRSs are simultaneously applied to both ends of a first electrode.

With reference to FIG. 4A, for the purpose of double routing-based pre-driving, a DRL and a PCL are connected to one end of each first electrode, and a DRL' and a PCL' are also connected to the other end.

For example, a driving line DRL1 and a pre-charge line PCL1 are connected to one end of a first electrode Tx1, and a driving line DRL1' and a pre-charge line PCL1' are connected to the other end of the first electrode Tx1. Likewise, a driving line DRL2 and a pre-charge line PCL2 are connected to one end of a first electrode Tx2, and a driving line DRL2' and a pre-charge line PCL2' are connected to the other end of the first electrode Tx2.

FIG. 4B illustrates a basic structure for applying a "single routing scheme", according to which a DRS is applied to only one end of a first electrode.

With reference to FIG. 4B, for the purpose of single routing-based pre-driving, a DRL and a PCL are connected to only one end of each first electrode.

For example, a driving line DRL1 and a pre-charge line PCL1 are connected to only one end of a first electrode Tx1.

Likewise, a driving line DRL2 and a pre-charge line PCL2 are connected to only one end of a first electrode Tx2.

When a DRL and a PCL are connected to one end or both ends of each first electrode as described above, and when a DRS is applied to a DRL connected to a first electrode, which has been chosen as a "driving electrode" among first electrodes Tx1-TxN, the touch IC unit 120 applies a PCS to a PCL connected to "at least one first electrode", which has been chosen as a "pre-driving electrode" among the remaining first electrodes except the first electrode that has been chosen as the driving electrode.

As described above, application of the pre-driving scheme using the structure of FIGS. 4A and 4B is advantageous in that the first electrodes Tx1-TxN can be driven using a low voltage, without degrading the SNR, and it becomes unnecessary to increase the accumulated number of repeated driving of the first electrodes Tx1-TxN for the purpose of increasing the SNR.

According to the pre-driving scheme, on the other hand, a first electrode chosen as a driving electrode and a first electrode chosen as a pre-driving electrode are driven simultaneously, i.e. a DRS is applied to a first electrode chosen as a driving electrode and, at the same time, a PCS is applied to a first electrode chosen as a pre-driving electrode, as a result of which errors may occur to sensing signals (e.g. voltage information, capacitance information) sensed at respective second electrodes Rx1-RxM.

In other words, sensing signals, which are sensed at respective second electrodes Rx1-RxM according to driving of a first electrode chosen as a driving electrode, may be varied by a PCS applied to a first electrode chosen as a pre-driving electrode. This may result in touch coordinate detection errors.

Therefore, resistors are connected to PCLs connected to respective first electrodes, as illustrated in FIGS. 4A and 4B, to lower the voltage of a PCS applied to a first electrode, which has been chosen as a pre-driving electrode, through its PCL.

As a result, the voltage of a PCS applied to the first electrode, which has been chosen as the pre-driving electrode, through its PCL is lower than the voltage of a DRS applied to the first electrode chosen as the driving electrode.

Consequently, the voltage or capacitance, which is identified from sensing signals sensed at respective second electrodes Rx1-RxM, can be determined only by the voltage of the DRS that has been applied to the first electrode chosen as the driving electrode.

In other words, sensing signals, which are sensed at respective second electrodes Rx1-RxM as a result of driving of the first electrode chosen as the driving electrode, are not changed by the PCS applied to the first electrode chosen as the pre-driving electrode.

As such, connecting resistors to PCLs connected to respective first electrodes makes it possible to achieve goals (realizing low-voltage driving, reducing the accumulated number, etc.), which have been sought through pre-driving, with such pre-driving having no influence on actual driving at all.

As described above briefly, on the other hand, the pre-driving scheme can be divided into single pre-driving, according to which only one pre-driving electrode is driven together when one driving electrode is driven, and multi-pre-driving according to which at least two pre-driving electrodes are driven together.

In addition, example embodiments of the present invention can provide, as a routing scheme for successively applying DRSs from the touch IC unit 20 to a first electrode, either a "single routing scheme", according to which a DRS is applied to only one end of a first electrode as illustrated in FIG. 4A, or a "double routing scheme" according to which DRSs are simultaneously applied to both ends of a first electrode as illustrated in FIG. 4B.

Hereinafter, therefore, a double routing-based single pre-driving scheme will be described with reference to FIGS. 5 and 6, a single routing-based single pre-driving scheme will be described with reference to FIGS. 7 and 8, a double routing-based multi-pre-driving scheme will be described with reference to FIGS. 9 and 10, and a single routing-based multi-pre-driving scheme will be described with reference to FIGS. 11 and 12. It will be assumed in the following, for convenience of description, that N=6 and M=5.

Figure 5:
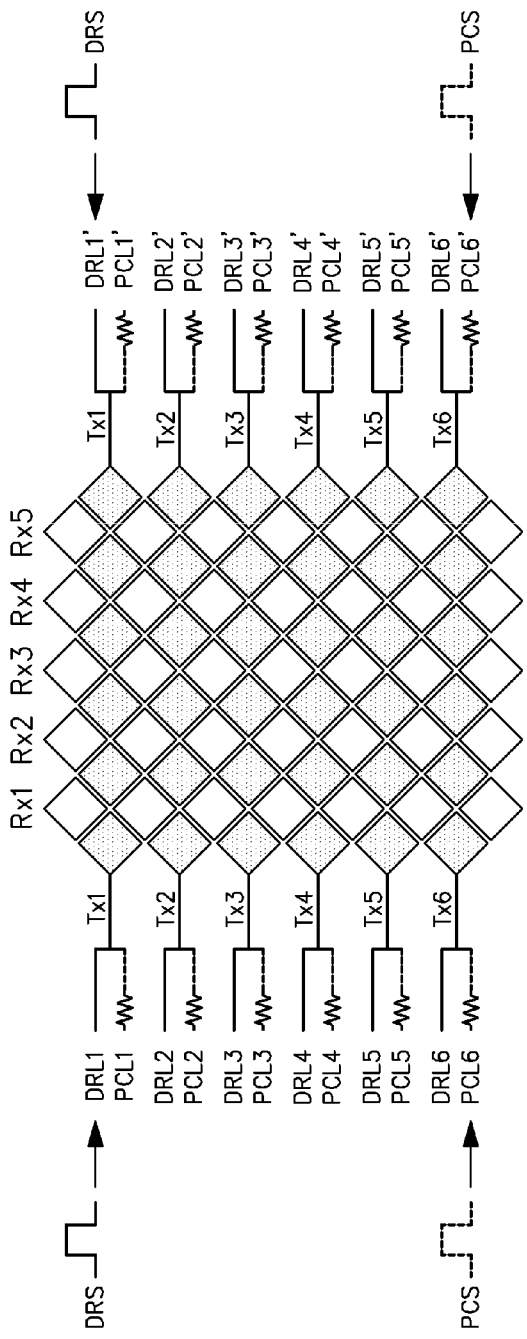
FIG. 5 illustrates a double routing-based single pre-driving scheme in a touch system according to an embodiment.

FIG. 5 illustrates a double routing-based single pre-driving scheme in a touch system 100 according to an embodiment.

FIG. 5 illustrates a procedure of driving a first electrode Tx1 among six first electrodes Tx1-Tx6.

With reference to FIG. 5, the touch IC unit 120 chooses a first electrode Tx6 as a pre-driving electrode among first electrodes Tx2-Tx6, which remain after a first electrode Tx1 has been chosen as a driving electrode from six first electrodes Tx1-Tx6.

Accordingly, the touch IC unit 120 applies a DRS to the first electrode Tx1, which has been chosen as a driving electrode, and simultaneously applies a PCS to the first electrode Tx6 which has been chosen as a pre-driving electrode.

This will be described in more detail with reference to FIG. 5: in order to drive the first electrode Tx1, which has been chosen as the driving electrode, the touch IC unit 120 applies a DRS to the driving line DRL1 connected to one end of the first electrode Tx1, which has been chosen as the driving electrode, and, according to the double routing scheme, simultaneously applies a DRS to the driving line DRL1' connected to the other end of the first electrode chosen as the driving electrode.

In addition, the touch IC unit 120 drives the first electrode Tx6, which has been chosen as the pre-driving electrode, concurrently with driving of the first electrode Tx1 which has been chosen as the driving electrode.

To this end, the touch IC unit 120 applies a PCS to a pre-charge line PCL6 connected to one end of the first electrode Tx6, which has been chosen as the pre-driving electrode, and, according to the double routing scheme, simultaneously applies a PCS to a pre-charge line PCL6' connected to the other end of the first electrode Tx6, which has been chosen as the pre-driving electrode.

When choosing a pre-driving electrode to drive a first electrode chosen as the driving electrode, on the other hand, the touch IC unit 120 may choose, as the pre-driving electrode, a first electrode that is positioned symmetrically with regard to the first electrode chosen as the driving electrode.

For example, when Tx1 is chosen as the driving electrode, Tx6 may be chosen as the pre-driving electrode; when Tx2 is chosen as the driving electrode, Tx5 may be chosen as the pre-driving electrode; when Tx3 is chosen as the driving electrode, Tx4 may be chosen as the pre-driving electrode; when Tx4 is chosen as the driving electrode, Tx3 may be chosen as the pre-driving electrode; when Tx5 is chosen as the driving electrode, Tx2 may be chosen as the pre-driving electrode; and, when Tx6 is chosen as the driving electrode, Tx1 may be chosen as the pre-driving electrode.

That is, the first electrode chosen as the driving electrode and the first electrode chosen as the pre-driving electrode are positioned symmetrically with each other with reference to the center area of the touch panel 110.

When choosing a pre-driving electrode in order to drive a first electrode chosen as the driving electrode, the touch IC unit 120 may also choose, as the pre-driving electrode, a first electrode that is not positioned symmetrically with regard to the first electrode chosen as the driving electrode.

Hereinafter, a connection structure regarding driving lines DRL1-DRL6, DRL1'-DRL6', which are configured to apply DRSs to six first electrodes Tx1-Tx6, respectively, and pre-charge lines PCL1-PCL6, PCL1'-PCL6', which are configured to apply PCSs to the six first electrodes Tx1-Tx6, respectively, will be described with reference to FIG. 6.

Figure 6:
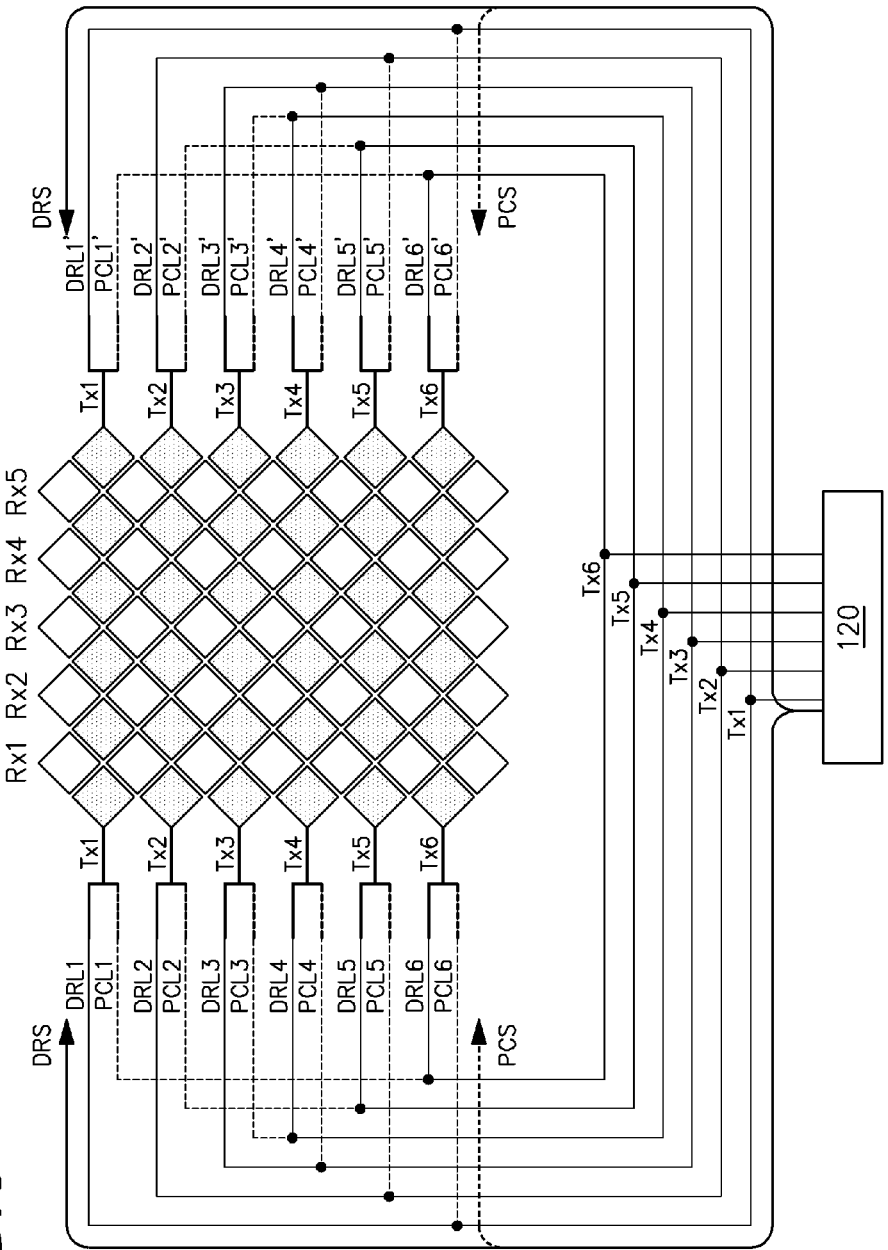
FIG. 6 illustrates a signal line structure for a double routing-based single pre-driving scheme in a touch system according to an embodiment.

In FIG. 6, the driving lines DRL1-DRL6, DRL1'-DRL6' that are connected to both ends of the six first electrodes Tx1-Tx6, respectively, are marked with solid lines, and the pre-charge lines PCL1-PCL6, PCL1'-PCL6' that are connected to both ends of the six first electrodes Tx1-Tx6, respectively, are marked with dotted lines.

In addition, resistors are connected in series in the middle of the pre-charge lines PCL1-PCL6, PCL1'-PCL6', which are connected to both ends of the six first electrodes Tx1-Tx6, respectively, but are omitted in FIG. 6 for convenience of description.

FIG. 6 illustrates a signal line structure for a double routing-based single pre-driving scheme in a touch system 100 according to an embodiment.

As described above, when choosing a pre-driving electrode in order to drive a first electrode chosen as the driving electrode, the touch IC unit 120 may choose, as the pre-driving electrode, a first electrode that is positioned symmetrically with regard to the first electrode chosen as the driving electrode.

For example, when Tx1 is chosen as the driving electrode, Tx6 may be chosen as the pre-driving electrode; when Tx2 is chosen as the driving electrode, Tx5 may be chosen as the pre-driving electrode; when Tx3 is chosen as the driving electrode, Tx4 may be chosen as the pre-driving electrode; when Tx4 is chosen as the driving electrode, Tx3 may be chosen as the pre-driving electrode; when Tx5 is chosen as the driving electrode, Tx2 may be chosen as the pre-driving electrode; and, when Tx6 is chosen as the driving electrode, Tx1 may be chosen as the pre-driving electrode.

Therefore, in order to drive Tx1, driving lines DRL1, DRL1' are connected from the touch IC unit 120 to both ends of Tx1. In addition, in order to pre-drive Tx6 when Tx1 is driven, pre-charge lines PCL6, PCL6' branch off from the driving lines DRL1, DRL1', which are connected from the touch IC unit 120 to both ends of Tx1, and connect to Tx6.

Likewise, in order to drive Tx2, driving lines DRL2, DRL2' are connected from the touch IC unit 120 to both ends of Tx2. In addition, in order to pre-drive Tx5 when Tx2 is driven, pre-charge lines PCL5, PCL5' branch off from the driving lines DRL2, DRL2', which are connected from the touch IC unit 120 to both ends of Tx2, and connect to Tx5.

In addition, in order to drive Tx3, driving lines DRL3, DRL3' are connected from the touch IC unit 120 to both ends of Tx3. In addition, in order to pre-drive Tx4 when Tx3 is driven, pre-charge lines PCL4, PCL4' branch off from the driving lines DRL3, DRL3', which are connected from the touch IC unit 120 to both ends of Tx3, and connect to Tx4.

In addition, in order to drive Tx4, driving lines DRL4, DRL4' are connected from the touch IC unit 120 to both ends of Tx4. In addition, in order to pre-drive Tx3 when Tx4 is driven, pre-charge lines PCL3, PCL3' branch off from the driving lines DRL4, DRL4', which are connected from the touch IC unit 120 to both ends of Tx4, and connect to Tx3.

In addition, in order to drive Tx5, driving lines DRL5, DRL5' are connected from the touch IC unit 120 to both ends of Tx5. In addition, in order to pre-drive Tx2 when Tx5 is driven, pre-charge lines PCL2, PCL2' branch off from the driving lines DRL5, DRL5', which are connected from the touch IC unit 120 to both ends of Tx5, and connect to Tx2.

In addition, in order to drive Tx6, driving lines DRL6, DRL6' are connected from the touch IC unit 120 to both ends of Tx6. In addition, in order to pre-drive Tx1 when Tx6 is driven, pre-charge lines PCL1, PCL1' branch off from the driving lines DRL6, DRL6', which are connected from the touch IC unit 120 to both ends of Tx6, and connect to Tx1.

Having described a double routing-based single pre-driving scheme above, a single routing-based single pre-driving scheme will now be described with reference to FIGS. 7 and 8.

Figure 7:
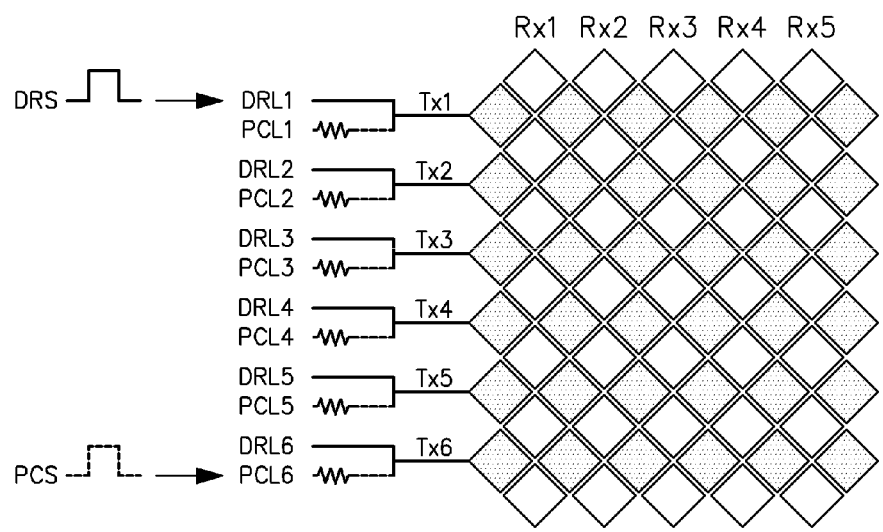
FIG. 7 illustrates a single routing-based single pre-driving scheme in a touch system according to an embodiment.

FIG. 7 illustrates a single routing-based single pre-driving scheme in a touch system 100 according to an embodiment.

FIG. 7 illustrates a procedure of driving a first electrode Tx1 among six first electrodes Tx1-Tx6.

With reference to FIG. 7, the touch IC unit 120 chooses a first electrode Tx6 as a pre-driving electrode among first electrodes Tx2-Tx6, which remain after a first electrode Tx1 has been chosen as a driving electrode from six first electrodes Tx1-Tx6.

Accordingly, the touch IC unit 120 applies a DRS to the first electrode Tx1, which has been chosen as a driving electrode, and simultaneously applies a PCS to the first electrode Tx6 which has been chosen as a pre-driving electrode.

This will be described in more detail with reference to FIG. 7: in order to drive the first electrode Tx1, which has been chosen as the driving electrode, the touch IC unit 120 applies a DRS to the driving line DRL1 connected to one end (or the other end) of the first electrode Tx1, which has been chosen as the driving electrode.

In addition, the touch IC unit 120 drives the first electrode Tx6, which has been chosen as the pre-driving electrode, concurrently with driving of the first electrode Tx1 which has been chosen as the driving electrode.

To this end, the touch IC unit 120 applies a PCS to the pre-charge line PCL6 connected to one end (or the other end) of the first electrode Tx1 that has been chosen as the pre-driving electrode.

When choosing a pre-driving electrode in order to drive a first electrode chosen as the driving electrode, on the other hand, the touch IC unit 120 may choose, as the pre-driving electrode, a first electrode that is positioned symmetrically with regard to the first electrode chosen as the driving electrode.

For example, when Tx1 is chosen as the driving electrode, Tx6 may be chosen as the pre-driving electrode; when Tx2 is chosen as the driving electrode, Tx5 may be chosen as the pre-driving electrode; when Tx3 is chosen as the driving electrode, Tx4 may be chosen as the pre-driving electrode; when Tx4 is chosen as the driving electrode, Tx3 may be chosen as the pre-driving electrode; when Tx5 is chosen as the driving electrode, Tx2 may be chosen as the pre-driving electrode; and, when Tx6 is chosen as the driving electrode, Tx1 may be chosen as the pre-driving electrode.

That is, the first electrode chosen as the driving electrode and the first electrode chosen as the pre-driving electrode are positioned symmetrically with each other with reference to the center area of the touch panel 110.

When choosing a pre-driving electrode in order to drive a first electrode chosen as the driving electrode, the touch IC unit 120 may also choose, as the pre-driving electrode, a first electrode that is not positioned symmetrically with regard to the first electrode chosen as the driving electrode.

Hereinafter, a connection structure regarding driving lines DRL1-DRL6, which are configured to apply DRSs to six first electrodes Tx1-Tx6, respectively, and pre-charge lines PCL1-PCL6, which are configured to apply PCSs to the six first electrodes Tx1-Tx6, respectively, will be described with reference to FIG. 8.

Figure 8:
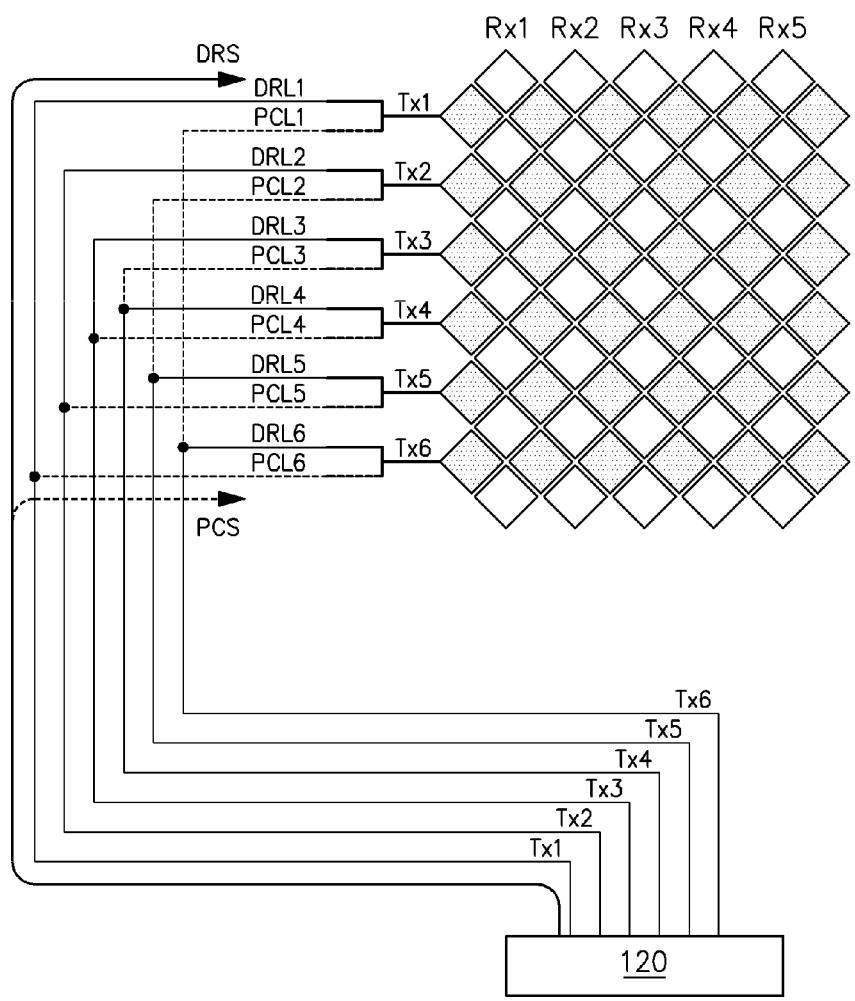
FIG. 8 illustrates a signal line structure for a single routing-based single pre-driving scheme in a touch system according to an embodiment.

In FIG. 8, the driving lines DRL1-DRL6 that are connected to one end of the six first electrodes Tx1-Tx6, respectively, are marked with solid lines, and the pre-charge lines PCL1-PCL6 that are connected to one end of the six first electrodes Tx1-Tx6, respectively, are marked with dotted lines.

In addition, resistors are connected in series in the middle of the pre-charge lines PCL1-PCL6, which are connected to one end of the six first electrodes Tx1-Tx6, respectively, but are omitted in FIG. 8 for convenience of description.

FIG. 8 illustrates a signal line structure for a single routing-based single pre-driving scheme in a touch system 100 according to an embodiment.

As described above, when choosing a pre-driving electrode in order to drive a first electrode chosen as the driving electrode, the touch IC unit 120 may choose, as the pre-driving electrode, a first electrode that is positioned symmetrically with regard to the first electrode chosen as the driving electrode.

For example, when Tx1 is chosen as the driving electrode, Tx6 may be chosen as the pre-driving electrode; when Tx2 is chosen as the driving electrode, Tx5 may be chosen as the pre-driving electrode; when Tx3 is chosen as the driving electrode, Tx4 may be chosen as the pre-driving electrode; when Tx4 is chosen as the driving electrode, Tx3 may be chosen as the pre-driving electrode; when Tx5 is chosen as the driving electrode, Tx2 may be chosen as the pre-driving electrode; and, when Tx6 is chosen as the driving electrode, Tx1 may be chosen as the pre-driving electrode.

Therefore, in order to drive Tx1, a driving line DRL1 is connected from the touch IC unit 120 to one end of Tx1. In addition, in order to pre-drive Tx6 when Tx1 is driven, a pre-charge line PCL6 branches off from the driving line DRL1, which is connected from the touch IC unit 120 to one end of Tx1, and connects to Tx6.

Likewise, in order to drive Tx2, a driving line DRL2 is connected from the touch IC unit 120 to one end of Tx2. In addition, in order to pre-drive Tx5 when Tx2 is driven, a pre-charge line PCL5 branches off from the driving line DRL2, which is connected from the touch IC unit 120 to one end of Tx2, and connects to Tx5.

In addition, in order to drive Tx3, a driving line DRL3 is connected from the touch IC unit 120 to one end of Tx3. In addition, in order to pre-drive Tx4 when Tx3 is driven, a pre-charge line PCL4 branches off from the driving line DRL3, which is connected from the touch IC unit 120 to one end of Tx3, and connects to Tx4.

In addition, in order to drive Tx4, a driving line DRL4 is connected from the touch IC unit 120 to one end of Tx4. In addition, in order to pre-drive Tx3 when Tx4 is driven, a pre-charge line PCL3 branches off from the driving line DRL4, which is connected from the touch IC unit 120 to one end of Tx4, and connects to Tx3.

In addition, in order to drive Tx5, a driving line DRL5 is connected from the touch IC unit 120 to one end of Tx5. In addition, in order to pre-drive Tx2 when Tx5 is driven, a pre-charge line PCL2 branches off from the driving line DRL5, which is connected from the touch IC unit 120 to one end of Tx5, and connects to Tx2.

In addition, in order to drive Tx6, a driving line DRL6 is connected from the touch IC unit 120 to one end of Tx6. In addition, in order to pre-drive Tx1 when Tx6 is driven, a pre-charge line PCL1 branches off from the driving line DRL6, which is connected from the touch IC unit 120 to one end of Tx6, and connects to Tx1.

A single pre-driving scheme has been described so far. In other words, a single pre-driving scheme based on double routing or single routing has been described.

Hereinafter, a multi-pre-driving scheme will be described. Specifically, a double routing-based multi-pre-driving scheme and a single routing-based multi-pre-driving scheme will be described.

First, the double routing-based multi-pre-driving scheme will be described with reference to FIGS. 9 and 10.

Figure 9:
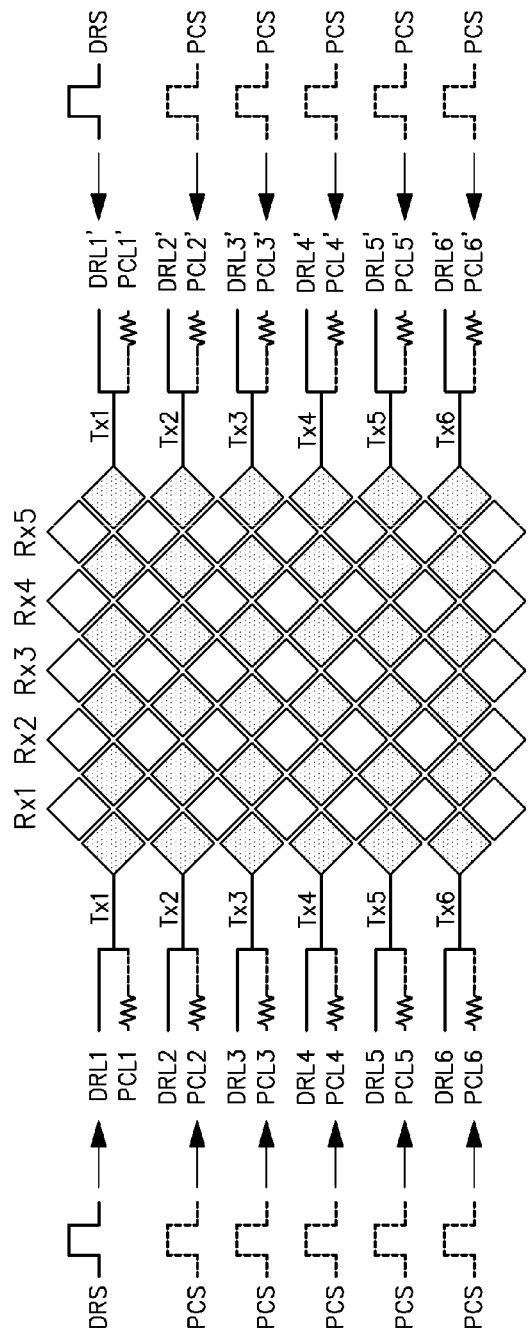
FIG. 9 illustrates a double routing-based multi-pre-driving scheme in a touch system according to an embodiment.

FIG. 9 illustrates double routing-based multi-pre-driving in a touch system 100 according to an embodiment.

FIG. 9 illustrates an exemplary procedure of driving a first electrode Tx1 among six first electrodes Tx1-Tx6.

The touch IC unit 120 can choose at least two first electrodes Tx6 as pre-driving electrodes among first electrodes Tx2-Tx6, which remain after a first electrode Tx1 has been chosen as a driving electrode from six first electrodes Tx1-Tx6. It will be assumed in the following, for convenience of description, that, except the first electrode Tx1 chosen as the driving electrode, all remaining first electrodes Tx2-Tx6 are chosen as pre-driving electrodes.

When all other first electrodes Tx2-Tx6 than the first electrode Tx1, which has been chosen as the driving electrode, are chosen as pre-driving electrodes as described above, the touch IC unit 120 applies a DRS to the first electrode Tx1, which has been chosen as the driving electrode, and simultaneously applies PCSs to all remaining first electrodes Tx2-Tx6 as pre-driving electrodes.

This will be described in more detail with reference to FIG. 9: in order to drive the first electrode Tx1, which has been chosen as the driving electrode, the touch IC unit 120 applies a DRS to the driving line DRL1 connected to one end of the first electrode Tx1, which has been chosen as the driving electrode, and, according to the double routing scheme, simultaneously applies a DRS to the driving line DRL1' connected to the other end of the first electrode Tx1 chosen as the driving electrode.

In addition, the touch IC unit 120 drives all remaining first electrodes Tx2-Tx6, which have been chosen as the pre-driving electrodes, concurrently with driving of the first electrode Tx1 which has been chosen as the driving electrode.

To this end, the touch IC unit 120 applies PCSs to pre-charge lines PCL2-PCL6 connected to one end of all remaining first electrodes Tx2-Tx6 chosen as pre-driving electrodes, respectively, and, according to the double routing scheme, simultaneously applies PCSs to pre-charge lines PCL2'-PCL6' connected to the other end of all remaining first electrodes Tx2-Tx6 chosen as pre-driving electrodes, respectively.

Hereinafter, a connection structure regarding driving lines DRL1-DRL6, DRL1'-DRL6', which are configured to apply DRSs to six first electrodes Tx1-Tx6, respectively, and pre-charge lines PCL1-PCL6, PCL1'-PCL6', which are configured to apply PCSs to the six first electrodes Tx1-Tx6, respectively, will be described with reference to FIG. 10.

Figure 10:
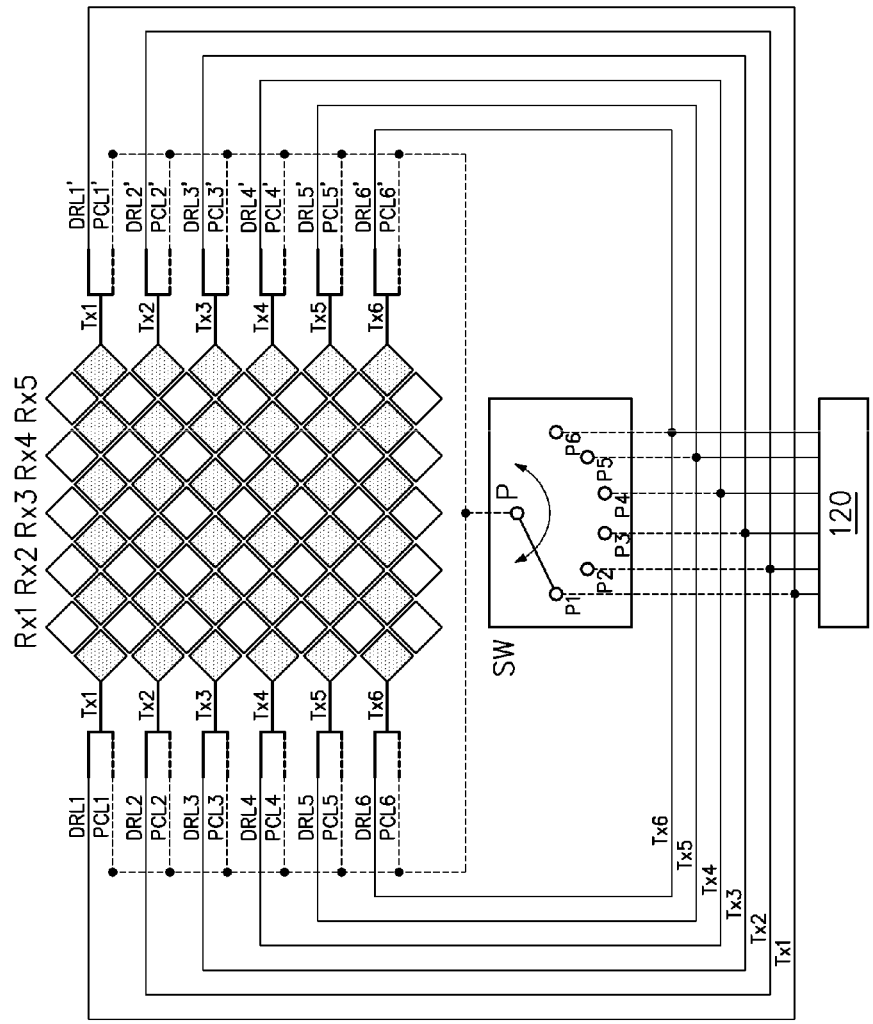
FIG. 10 illustrates a signal line structure for a double routing-based multi-pre-driving scheme in a touch system according to an embodiment.

In FIG. 10, the driving lines DRL1-DRL6, DRL1'-DRL6' that are connected to both ends of the six first electrodes Tx1-Tx6, respectively, are marked with solid lines, and the pre-charge lines PCL1-PCL6, PCL1'-PCL6' that are connected to both ends of the six first electrodes Tx1-Tx6, respectively, are marked with dotted lines.

In addition, resistors are connected in series in the middle of the pre-charge lines PCL1-PCL6, PCL1'-PCL6', which are connected to both ends of the six first electrodes Tx1-Tx6, respectively, but are omitted in FIG. 10 for convenience of description.

FIG. 10 illustrates a signal line structure for a double routing-based multi-pre-driving scheme in a touch system 100 according to an embodiment.

As described above, when the touch IC unit 120 drives the first electrode chosen as the driving electrode, it drives (pre-drives) all remaining first electrodes together.

The signal line connection structure to this end is as follows: DRLs are connected from the touch IC unit 120 to both ends (one end, the other end) of the first electrodes, respectively, PCLs connected to both ends (one end, the other end) of the first electrodes, respectively, are combined and connected to an output port P of a switch SW, and the DRLs connected from the touch IC unit 120 to both ends (one end, the other end) of the first electrodes, respectively, have branches connected to corresponding input ports of the switch SW, respectively.

This will be described in more detail with reference to FIG. 10: the pre-charge lines PCL1-PCL6, PCL1'-PCL6' connected to both ends of all first electrodes Tx1-Tx6, respectively, are combined and connected to an output port P of a switch SW.

In order to drive Tx1, driving lines DRL1, DRL1' are connected from the touch IC unit 120 to both ends of Tx1.

In connection with driving of Tx1, furthermore, in order to pre-drive all remaining first electrodes Tx2-Tx6, the driving lines DRL1, DRL1' connected from the touch IC unit 120 to both ends of Tx1 have a branch connected to an input port P1, which corresponds to Tx1, among input ports of the switch SW.

During driving of Tx1, in practice, the output port P and the input port P1 are connected by a switching operation of the switch SW under control of the touch IC unit 120. As a result, a DRS outputted by the touch IC unit 120 to drive Tx1 is applied to Tx1 and, at the same time, also applied as a PCS to all remaining first electrodes Tx2-Tx6.

Likewise, in order to drive Tx2, driving lines DRL2, DRL2' are connected from the touch IC unit 120 to both ends of Tx2.

In connection with driving of Tx2, furthermore, in order to pre-drive all remaining first electrodes Tx1, Tx3-Tx6, the driving lines DRL2, DRL2' connected from the touch IC unit 120 to both ends of Tx2 have a branch connected to an input port P2, which corresponds to Tx2, among input ports of the switch SW.

During driving of Tx2, in practice, the output port P and the input port P2 are connected by a switching operation of the switch SW under control of the touch IC unit 120. As a result, a DRS outputted by the touch IC unit 120 to drive Tx2 is applied to Tx2 and, at the same time, also applied as a PCS to all remaining first electrodes Tx1, Tx3-Tx6.

In addition, in order to drive Tx3, driving lines DRL3, DRL3' are connected from the touch IC unit 120 to both ends of Tx3.

In connection with driving of Tx3, furthermore, in order to pre-drive all remaining first electrodes Tx1-Tx2, Tx4-Tx6, the driving lines DRL3, DRL3' connected from the touch IC unit 120 to both ends of Tx3 have a branch connected to an input port P3, which corresponds to Tx3, among input ports of the switch SW.

During driving of Tx3, in practice, the output port P and the input port P3 are connected by a switching operation of the switch SW under control of the touch IC unit 120. As a result, a DRS outputted by the touch IC unit 120 to drive Tx3 is applied to Tx3 and, at the same time, also applied as a PCS to all remaining first electrodes Tx1-Tx2, Tx4-Tx6.

In addition, in order to drive Tx4, driving lines DRL4, DRL4' are connected from the touch IC unit 120 to both ends of Tx4.

In connection with driving of Tx4, furthermore, in order to pre-drive all remaining first electrodes Tx1-Tx3, Tx5-Tx6, the driving lines DRL4, DRL4' connected from the touch IC unit 120 to both ends of Tx4 have a branch connected to an input port P4, which corresponds to Tx4, among input ports of the switch SW.

During driving of Tx4, in practice, the output port P and the input port P4 are connected by a switching operation of the switch SW under control of the touch IC unit 120. As a result, a DRS outputted by the touch IC unit 120 to drive Tx4 is applied to Tx4 and, at the same time, also applied as a PCS to all remaining first electrodes Tx1-Tx3, Tx5-Tx6.

In addition, to drive Tx5, driving lines DRL5, DRL5' are connected from the touch IC unit 120 to both ends of Tx5.

In connection with driving of Tx5, furthermore, in order to pre-drive all remaining first electrodes Tx1-Tx4, Tx6, the driving lines DRL5, DRL5' connected from the touch IC unit 120 to both ends of Tx5 have a branch connected to an input port P5, which corresponds to Tx5, among input ports of the switch SW.

During driving of Tx5, in practice, the output port P and the input port P5 are connected by a switching operation of the switch SW under control of the touch IC unit 120. As a result, a DRS outputted by the touch IC unit 120 to drive Tx5 is applied to Tx5 and, at the same time, also applied as a PCS to all remaining first electrodes Tx1-Tx4, Tx6.

In addition, in order to drive Tx6, driving lines DRL6, DRL6' are connected from the touch IC unit 120 to both ends of Tx6.

In connection with driving of Tx6, furthermore, in order to pre-drive all remaining first electrodes Tx1-Tx5, the driving lines DRL6, DRL6' connected from the touch IC unit 120 to both ends of Tx6 have a branch connected to an input port P6, which corresponds to Tx6, among input ports of the switch SW.

During driving of Tx6, in practice, the output port P and the input port P6 are connected by a switching operation of the switch SW under control of the touch IC unit 120. As a result, a DRS outputted by the touch IC unit 120 to drive Tx6 is applied to Tx6 and, at the same time, also applied as a PCS to all remaining first electrodes Tx1-Tx5.

Having described a double routing-based multi-pre-driving scheme above, a single routing-based multi-pre-driving scheme will now be described with reference to FIGS. 11 and 12.

Figure 11:
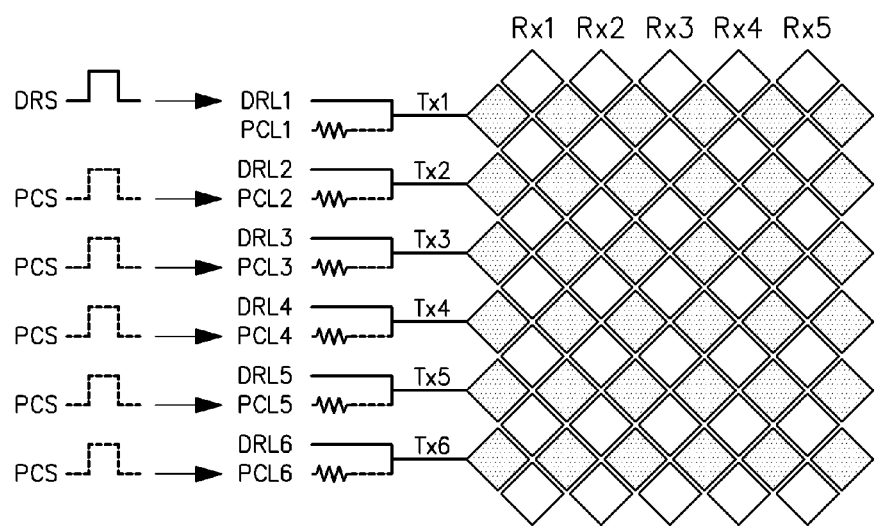
FIG. 11 illustrates a single routing-based multi-pre-driving scheme in a touch system according to an embodiment.

FIG. 11 illustrates single routing-based multi-pre-driving in a touch system 100 according to an embodiment.

FIG. 11 illustrates an exemplary procedure of driving a first electrode Tx1 among six first electrodes Tx1-Tx6.

The touch IC unit 120 can choose at least two first electrodes Tx6 as pre-driving electrodes among first electrodes Tx2-Tx6, which remain after a first electrode Tx1 has been chosen as a driving electrode from six first electrodes Tx1-Tx6. It will be assumed in the following, for convenience of description, that, except the first electrode Tx1 chosen as the driving electrode, all remaining first electrodes Tx2-Tx6 are chosen as pre-driving electrodes.

When all other first electrodes Tx2-Tx6 than the first electrode Tx1, which has been chosen as the driving electrode, are chosen as pre-driving electrodes as described above, the touch IC unit 120 applies a DRS to the first electrode Tx1, which has been chosen as the driving electrode, and simultaneously applies PCSs to all remaining first electrodes Tx2-Tx6 as pre-driving electrodes.

This will be described in more detail with reference to FIG. 11: in order to drive the first electrode Tx1, which has been chosen as the driving electrode, the touch IC unit 120 applies a DRS to the driving line DRL1 connected to one end of the first electrode Tx1, which has been chosen as the driving electrode.

In addition, the touch IC unit 120 drives all remaining first electrodes Tx2-Tx6, which have been chosen as the pre-driving electrodes, concurrently with driving of the first electrode Tx1 which has been chosen as the driving electrode.

To this end, the touch IC unit 120 applies PCSs to the pre-charge lines PCL2-PCL6 that are connected to one end of all remaining first electrodes Tx2-Tx6, respectively, which have been chosen as pre-driving electrodes.

Hereinafter, a connection structure regarding driving lines DRL1-DRL6, which are configured to apply DRSs to six first electrodes Tx1-Tx6, respectively, and pre-charge lines PCL1-PCL6, which are configured to apply PCSs to the six first electrodes Tx1-Tx6, respectively, will be described with reference to FIG. 12.

Figure 12:
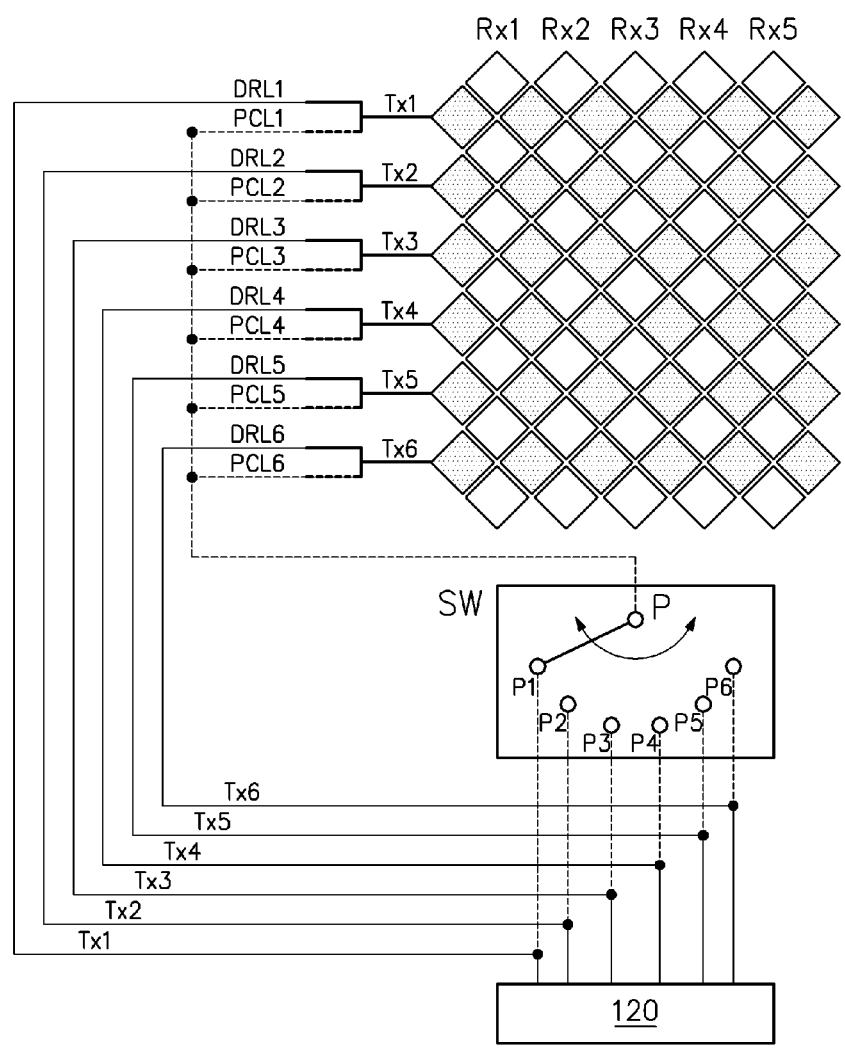
FIG. 12 illustrates a signal line structure for single routing-based multi-pre-driving scheme in a touch system according to an embodiment.

In FIG. 12, the driving lines DRL1-DRL6 that are connected to one end of the six first electrodes Tx1-Tx6, respectively, are marked with solid lines, and the pre-charge lines PCL1-PCL6 that are connected to one end of the six first electrodes Tx1-Tx6, respectively, are marked with dotted lines.

In addition, resistors are connected in series in the middle of the pre-charge lines PCL1-PCL6, which are connected to one end of the six first electrodes Tx1-Tx6, respectively, but are omitted in FIG. 12 for convenience of description.

FIG. 12 illustrates a signal line structure for a single routing-based multi-pre-driving scheme in a touch system 100 according to an embodiment.

As described above, when the touch IC unit 120 drives the first electrode chosen as the driving electrode, it drives (pre-drives) all remaining first electrodes together.

The signal line connection structure to this end is as follows: DRLs are connected from the touch IC unit 120 to either one end or the other end of the first electrodes, respectively, PCLs connected to either one end or the other end of the first electrodes, respectively, are combined and connected to an output port P of a switch SW, and the DRLs connected from the touch IC unit 120 to either one end or the other end of the first electrodes, respectively, have branches connected to corresponding input ports of the switch SW, respectively.

This will be described in more detail with reference to FIG. 12: the pre-charge lines PCL1-PCL6, which are connected to one end of all first electrodes Tx1-Tx6, respectively, are combined and connected to an output port P of a switch SW.

In order to drive Tx1, a driving line DRL1 is connected from the touch IC unit 120 to one end of Tx1.

In connection with driving of Tx1, furthermore, in order to pre-drive all remaining first electrodes Tx2-Tx6, the driving line DRL1 connected from the touch IC unit 120 to one end of Tx1 has a branch connected to an input port P1, which corresponds to Tx1, among input ports of the switch SW.

During driving of Tx1, in practice, the output port P and the input port P1 are connected by a switching operation of the switch SW under control of the touch IC unit 120. As a result, a DRS outputted by the touch IC unit 120 to drive Tx1 is applied to Tx1 and, at the same time, also applied as a PCS to all remaining first electrodes Tx2-Tx6.

Likewise, in order to drive Tx2, a driving line DRL2 is connected from the touch IC unit 120 to one end of Tx2.

In connection with driving of Tx2, furthermore, in order to pre-drive all remaining first electrodes Tx1, Tx3-Tx6, the driving line DRL2 connected from the touch IC unit 120 to one end of Tx2 has a branch connected to an input port P2, which corresponds to Tx2, among input ports of the switch SW.

During driving of Tx2, in practice, the output port P and the input port P2 are connected by a switching operation of the switch SW under control of the touch IC unit 120. As a result, a DRS outputted by the touch IC unit 120 to drive Tx2 is applied to Tx2 and, at the same time, also applied as a PCS to all remaining first electrodes Tx1, Tx3-Tx6.

In addition, to drive Tx3, a driving line DRL3 is connected from the touch IC unit 120 to one end of Tx3.

In connection with driving of Tx3, furthermore, in order to pre-drive all remaining first electrodes Tx1-Tx2, Tx4-Tx6, the driving line DRL3 connected from the touch IC unit 120 to one end of Tx3 has a branch connected to an input port P3, which corresponds to Tx3, among input ports of the switch SW.

During driving of Tx3, in practice, the output port P and the input port P3 are connected by a switching operation of the switch SW under control of the touch IC unit 120. As a result, a DRS outputted by the touch IC unit 120 to drive Tx3 is applied to Tx3 and, at the same time, also applied as a PCS to all remaining first electrodes Tx1-Tx2, Tx4-Tx6.

In addition, in order to drive Tx4, a driving line DRL4 is connected from the touch IC unit 120 to one end of Tx4.

In connection with driving of Tx4, furthermore, in order to pre-drive all remaining first electrodes Tx1-Tx3, Tx5-Tx6, the driving line DRL4 connected from the touch IC unit 120 to one end of Tx4 has a branch connected to an input port P4, which corresponds to Tx4, among input ports of the switch SW.

During driving of Tx4, in practice, the output port P and the input port P4 are connected by a switching operation of the switch SW under control of the touch IC unit 120. As a result, a DRS outputted by the touch IC unit 120 to drive Tx4 is applied to Tx4 and, at the same time, also applied as a PCS to all remaining first electrodes Tx1-Tx3, Tx5-Tx6.

In addition, to drive Tx5, a driving line DRL5 is connected from the touch IC unit 120 to one end of Tx5.

In connection with driving of Tx5, furthermore, in order to pre-drive all remaining first electrodes Tx1-Tx4, Tx6, the driving line DRL5 connected from the touch IC unit 120 to one end of Tx5 have a branch connected to an input port P5, which corresponds to Tx5, among input ports of the switch SW.

During driving of Tx5, in practice, the output port P and the input port P5 are connected by a switching operation of the switch SW under control of the touch IC unit 120. As a result, a DRS outputted by the touch IC unit 120 to drive Tx5 is applied to Tx5 and, at the same time, also applied as a PCS to all remaining first electrodes Tx1-Tx4, Tx6.

In addition, in order to drive Tx6, a driving line DRL6 is connected from the touch IC unit 120 to one end of Tx6.

In connection with driving of Tx6, furthermore, in order to pre-drive all remaining first electrodes Tx1-Tx5, the driving line DRL6 connected from the touch IC unit 120 to one end of Tx6 has a branch connected to an input port P6, which corresponds to Tx6, among input ports of the switch SW.

During driving of Tx6, in practice, the output port P and the input port P6 are connected by a switching operation of the switch SW under control of the touch IC unit 120. As a result, a DRS outputted by the touch IC unit 120 to drive Tx6 is applied to Tx6 and, at the same time, also applied as a PCS to all remaining first electrodes Tx1-Tx5.

Above descriptions have been directed to pre-driving schemes (single pre-driving scheme, multi-pre-driving scheme) based on double routing and single routing, respectively, which can enable low-voltage driving and reduce the accumulated number when driving first electrodes Tx1-Tx6 formed in a first direction.

Hereinafter, a number of embodiments of display devices, to which the touch system 100 capable of pre-driving described above has been applied, will be described.

Figure 13:
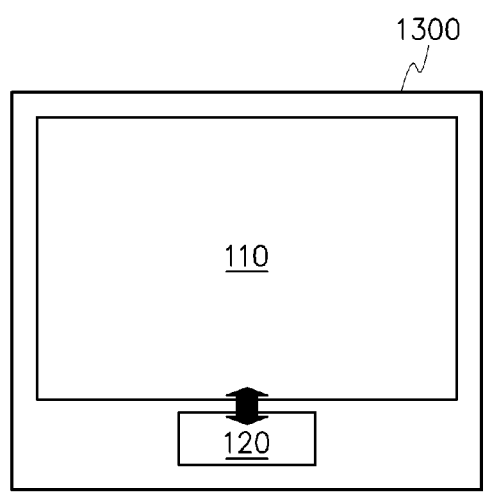
FIG. 13 illustrates a display device according to an embodiment.

FIG. 13 illustrates a display device 1300 according to an embodiment.

With reference to FIG. 13, the display device 1300 according to an embodiment includes a touch panel 110 having first electrodes formed in a first direction, second electrodes formed in a second direction, and driving lines and pre-charge lines connected to respective first electrodes; a touch IC unit 120 configured to successively apply driving signals to respective first electrodes, receive sensing signals through the second electrodes, and, when applying a driving signal to a first electrode chosen as a driving electrode from the first electrodes, apply a driving signal (pre-charge signal) to at least one different first electrode chosen as a pre-driving electrode; and the like.

Such application of a driving signal (pre-charge signal) to at least one different first electrode, which has been chosen as a pre-driving electrode, by the touch IC unit 120 corresponds to pre-driving.

Such pre-driving can be performed according to the above-described pre-driving scheme.

That is, the above-mentioned touch IC unit 120 can perform pre-driving according to one pre-driving scheme selected from a double routing-based single pre-driving scheme, a single routing-based single pre-driving scheme, a double routing-based multi-pre-driving scheme, and a single routing-based multi-pre-driving scheme, and repeated descriptions of detailed methods for performing the schemes will be omitted herein.

Meanwhile, the display device 1300 according to an embodiment illustrated in FIG. 13 further includes a display panel (not illustrated), to which the touch panel 110 may be attached in add-on type, or in which the touch panel 110 may be embedded in on-cell or in-cell type.

A case of including at least two touch panels 110, unlike the display device 1300 according to an embodiment illustrated in FIG. 13, will now be described.

Figure 14:
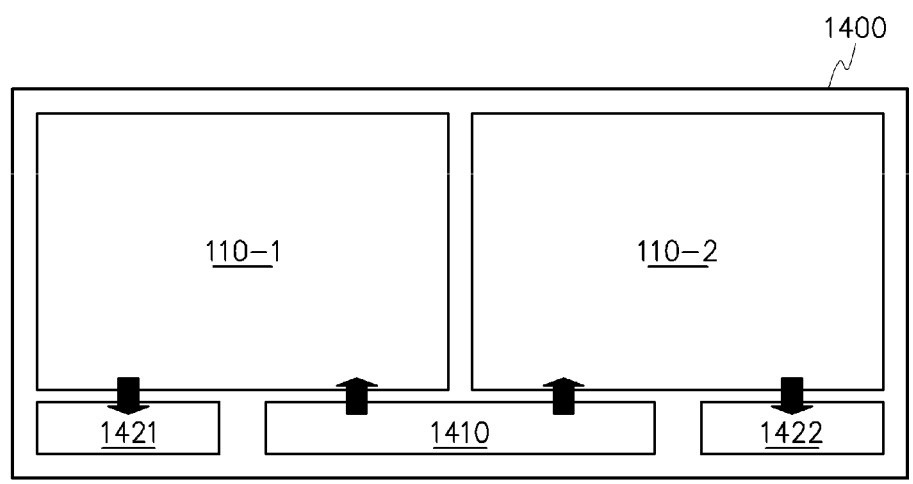
FIG. 14 illustrates a display device according to another embodiment.

FIG. 14 illustrates a display device 1400 according to another embodiment.

With reference to FIG. 14, the display device 1400 according to another embodiment includes at least two touch panels 110-1, 110-2 having first electrodes formed in a first direction, second electrodes formed in a second direction, and driving lines and pre-charge lines connected to respective first electrodes; a first IC unit 1410 configured so that, when simultaneously applying driving signals to driving lines connected to first electrodes chosen from the first electrodes formed on the at least two touch panels 110-1, 110-2, respectively, driving signals are simultaneously applied to pre-charge lines connected to at least one different first electrodes formed on the at least two touch panels, respectively; and the like.

With reference to FIG. 14, the display device 1400 according to another embodiment may further include at least two second IC units 1421, 1422 provided so as to correspond to the at least two touch panels 110-1, 110-2, respectively, and configured to receive sensing signals through the second electrodes formed on the corresponding touch panel 110-1 or 110-2.

The first IC unit 1410 of FIG. 14 is configured to implement only the IC portion that drives first electrodes in the case of the touch IC unit 120 of FIG. 1.

The second IC units 1421, 1422 of FIG. 14 are configured to implement only the IC portion that senses second electrodes in the case of the touch IC unit 120 of FIG. 1.

More specifically, the second IC unit 1421 corresponding to the first touch panel 110-1 is configured to implement only the IC portion that senses second electrodes formed on the first touch panel 110-1. The second IC unit 1422 corresponding to the second touch panel 110-2 is configured to implement only the IC portion that senses second electrodes formed on the second touch panel 110-2.

The first IC unit 1410 of the display device 1400 according to another embodiment can perform per-driving either in a single pre-driving scheme or in a multi-pre-driving scheme.

Figure 15:
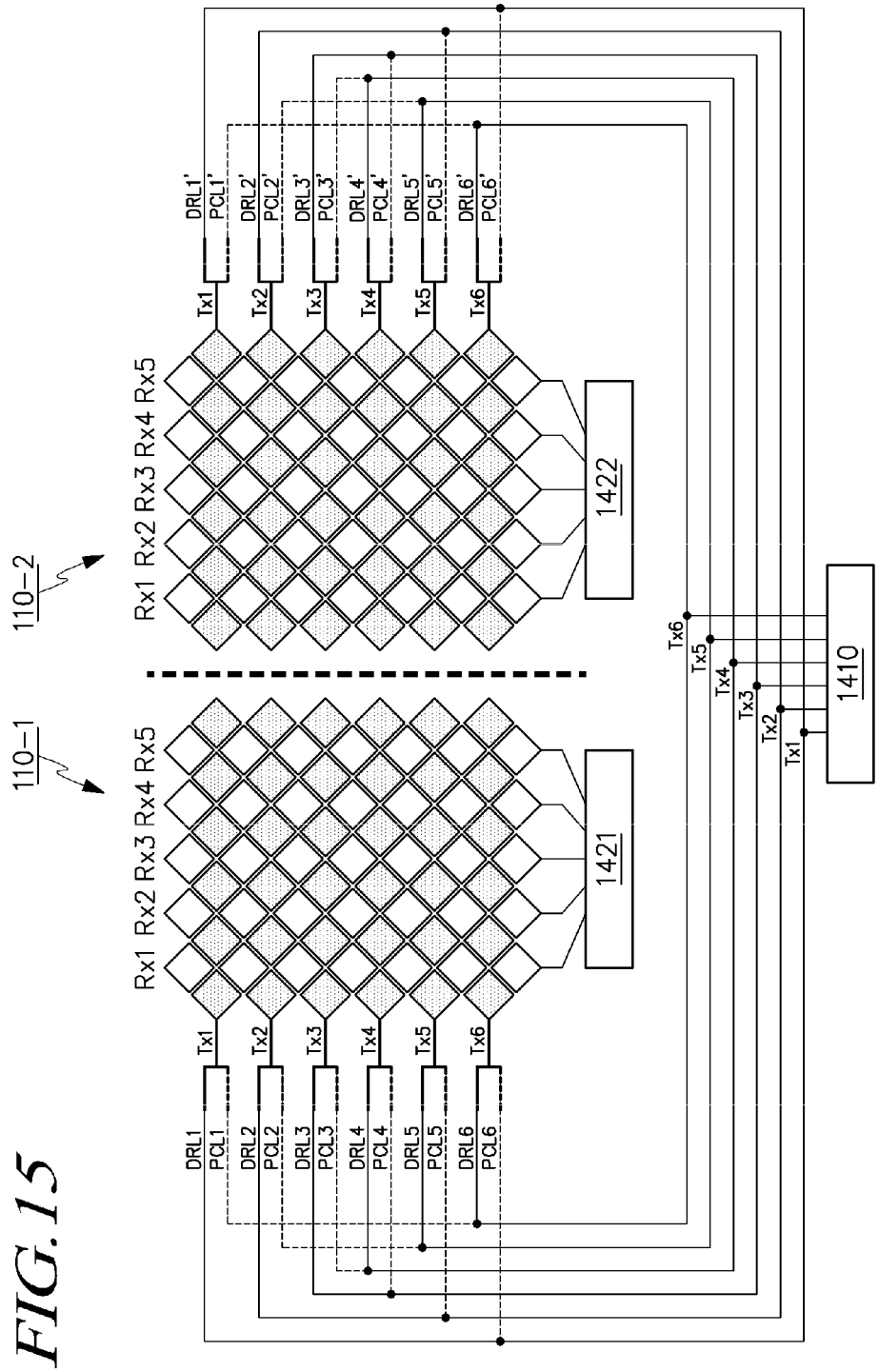
FIG. 15 illustrates a signal line structure for double routing-based single pre-driving scheme in a touch system according to another embodiment.

FIG. 15 illustrates a signal line structure when the first IC unit 1410 performs pre-driving in the single pre-driving scheme.

FIG. 15 illustrates two touch panels 110-1, 110-2 having respective touch electrodes, which correspond to the touch electrodes (first electrodes, second electrodes) of the single touch panel 110 illustrated in FIG. 6, which adopts a double routing-based single pre-driving scheme.

With reference to FIG. 15, the first IC unit 1410 of the display device 1400 according to another embodiment considers that the first touch panel 110-1 and the second touch panel 110-2 constitute a single touch panel 110 and, according to the double routing scheme, applies DRSs to one end of a first electrode, which corresponds to the driving electrode of the first touch panel 110-1, and to the other end of a first electrode, which corresponds to the driving electrode of the second touch panel 110-2.

At the same time, with reference to FIG. 15, the first IC unit 1410 of the display device 1400 according to another embodiment applies PRSs to one end of a first electrode, which corresponds to the pre-driving electrode of the first touch panel 110-1, and to the other end of a first electrode, which corresponds to the pre-driving electrode of the second touch panel 110-2, according to the double routing scheme.

Although FIG. 15 illustrates a structure based on the single pre-driving scheme, it is also possible to perform pre-driving in the multi-pre-driving scheme.

Specifically, the first IC unit 1410 of the display device 1400 according to another embodiment applies PRSs to one end of at least two first electrodes, which correspond to pre-driving electrodes of the first touch panel 110-1, and to the other end of at least two first electrodes, which correspond to pre-driving electrodes of the second touch panel 110-2, according to the double routing scheme.

The signal line structure when pre-driving is performed in the multi-pre-driving scheme can be obtained when the two touch panels 110-1, 110-2 have the same touch electrodes as the touch electrodes of the single touch panel 110 illustrated in FIG. 10, which illustrates a signal line structure of a double routing-based multi-pre-driving scheme.

Meanwhile, the display device 1400 according to another embodiment illustrated with reference to FIGS. 14 and 15 further includes a display panel (not illustrated), to which the touch panels 110-1, 110-2 may be attached in add-on type, or in which the touch panels 110-1, 110-2 may be embedded in on-cell or in-cell type.

Hereinafter, a display device 1600 according to still another embodiment, which includes at least two touch panels, will be described.

Figure 16:
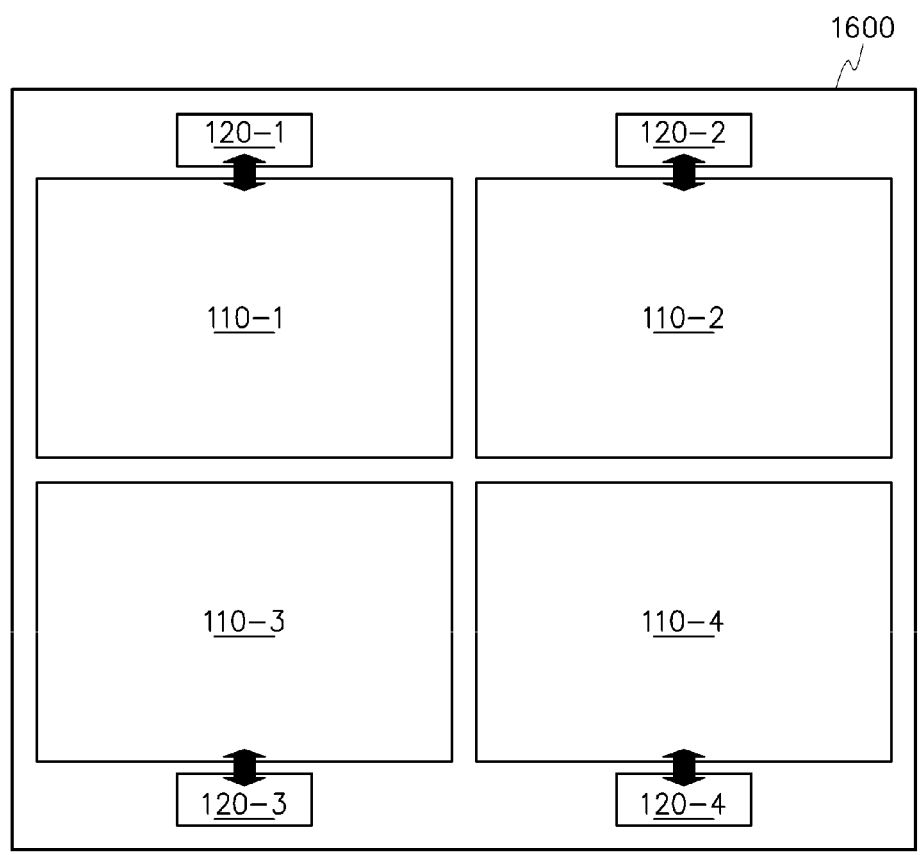
FIG. 16 illustrates a display device according to still another embodiment.

FIG. 16 illustrates a display device 1600 according to still another embodiment.

With reference to FIG. 16, the display device 1600 according to still another embodiment includes at least two touch panels 110-1, 110-2, 110-3, 110-4 having first electrodes formed in a first direction, second electrodes formed in a second direction, and driving lines and pre-charge lines connected to respective first electrodes; at least two touch IC units 120-1, 120-2, 120-3, 120-4 provided at the at least two touch panels 110-1, 110-2, 110-3, 110-4, respectively, to operate independently and configured so that, when applying a driving signal to a driving line connected to a first electrode chosen from first electrodes formed on the corresponding touch panel, a driving signal is simultaneously applied to a pre-charge line connected to at least one different first electrode formed on the corresponding touch panel; and the like.

Each of the at least two touch panels 110-1, 110-2, 110-3, 110-4 illustrated in FIG. 16 is the same as the touch panel 110 of FIG. 1.

In addition, each of the at least two touch IC units 120-1, 12-2, 120-3, 120-4 illustrated in FIG. 16 is the same as the touch IC unit 120 of FIG. 1.

The display device 1400 according to another embodiment illustrated in FIG. 14 and the display device 1600 according to still embodiment illustrated in FIG. 16 may be conventional small/medium-sized or large-sized displays, but may also be large-sized public displays installed at public places, specific venues, and the like.

The display device 1400 according to another embodiment illustrated in FIG. 14 and the display device 1600 according to still embodiment illustrated in FIG. 16 enable separate touch sensing for each touch panel and thereby provide a touch environment where a number of users can simultaneously touch and use a single display device 1400, 1600.

Meanwhile, the display device 1600 according to still another embodiment described with reference to FIG. 16 further includes a display panel (not illustrated), to which the touch panels 110-1, 110-2, 110-3, 110-4 may be attached in add-on type, or in which the touch panels 110-1, 110-2, 110-3, 110-4 may be embedded in on-cell or in-cell type.

As described above, a touch system, a touch panel, and a display device can be capable of accurate touch sensing, even with low-voltage driving, according to a pre-driving scheme.

In addition, a touch system, a touch panel, and a display device can provide accurate touch sensing, even with a reduced number of repeated driving and sensing, according to a pre-driving scheme.

In addition, a touch system, a touch panel, and a display device can be capable of reducing power consumption for touch sensing according to a pre-driving scheme.

In addition, a touch system, a touch panel, and a display device is provided that is capable of increasing the touch sensing rate according to a pre-driving scheme.

It will be apparent to those skilled in the art that various modifications and variations can be made in the touch system, the touch panel, and the display device of the present invention without departing from the spirit or scope of the invention. Thus, it is intended that the present invention cover the modifications and variations of this invention provided they come within the scope of the appended claims and their equivalents.

What is claimed is:

1. A touch system, comprising:
    a touch panel having first electrodes formed in a first direction, second electrodes formed in a second direction, and driving lines and pre-charge lines connected to respective first electrodes; and
    a touch IC unit configured to successively apply driving signals to the first electrodes, and receive sensing signals corresponding to capacitance information through the second electrodes,
    wherein during a first driving time for touch sensing, the touch IC unit applies the driving signal to a driving line connected to a first electrode chosen as a driving electrode of the first driving time from the first electrodes and simultaneously applies a pre-charge signal to a pre-charge line connected to at least one first electrode chosen as a pre-driving electrode from the other first electrodes except the first electrode chosen as the driving electrode, and
    during a second driving time for touch sensing, the touch IC unit chooses one of the at least one first electrode chosen as the pre-driving electrode for the first driving time as the driving electrode of the second driving time and applies the driving signal to a driving line connected to the driving electrode of the second driving time.

2. The touch system of claim 1, wherein the first electrode chosen as the driving electrode and the first electrode chosen as the pre-driving electrode are positioned symmetrically with each other with reference to a center area of the touch panel.

3. The touch system of claim 1, wherein the touch IC unit is configured to apply the driving signal to a driving line connected to at least one of one end and the other end of the first electrode chosen as the driving electrode and
    apply the pre-charge signal to a pre-charge line connected to at least one of one end and the other end of one first electrode chosen as the pre-driving electrode.

4. The touch system of claim 3, wherein, with regard to each of the first electrodes,
    the driving line is connected from the touch IC unit to at least one of one end and the other end of a corresponding first electrode, and
    the driving line connected from the touch IC unit to at least one of one end and the other end of the corresponding first electrode has a branch leading to a pre-charge line connected to the corresponding first electrode.

5. The touch system of claim 1, wherein the touch IC unit is configured to choose at least two first electrodes as the pre-driving electrodes from the other first electrodes than the first electrode chosen as the driving electrode.

6. The touch system of claim 5, wherein the touch IC unit is configured to apply the driving signal to a driving line connected to at least one of one end and the other end of the first electrode chosen as the driving electrode and
    apply the pre-charge signal to a pre-charge line connected to at least one of one end and the other end of each of the at least two first electrodes chosen as the pre-driving electrodes.

7. The touch system of claim 6, wherein, with regard to each of the first electrodes, the driving line is connected from the touch IC unit to at least one of one end and the other end of each of corresponding first electrodes, the driving line connected from the touch IC unit to at least one of one end and the other end of each of corresponding first electrodes has a branch connected to an input port associated with the corresponding first electrode among input ports of a switch, and pre-charge lines connected to at least one of one end and the other end of respective corresponding first electrodes are combined and connected to an output port of the switch.

8. The touch system of claim 1, wherein resistors are connected to the pre-charge lines.

9. The touch system of claim 1, wherein the pre-charge signals are the same signals as the driving signals.

10. A display device, comprising:

at least two touch panels having first electrodes formed in a first direction, second electrodes formed in a second direction, and driving lines and pre-charge lines connected to respective first electrodes;

a first touch IC unit configured so that, when simultaneously applying driving signals to first electrodes chosen from the first electrodes formed on the at least two touch panels, respectively, pre-charge signals are simultaneously applied to at least one different first electrode formed on each of the at least two touch panels; and at least two second IC units provided at the at least two touch panels, respectively, and configured to receive sensing signals corresponding to capacitance information through second electrodes formed on corresponding touch panels, wherein during a first driving time for touch sensing, the first touch IC unit applies the driving signal to a driving line connected to a first electrode chosen as a driving electrode of the first driving time from the first electrodes and simultaneously applies a pre-charge signal to a pre-charge line connected to at least one first electrode chosen as a pre-driving electrode from the other first electrodes except the first electrode chosen as the driving electrode, and during a second driving time for touch sensing, the first touch IC unit chooses one of the at least one first electrode chosen as the pre-driving electrode for the first driving time as the driving electrode of the second driving time and applies the driving signal to a driving line connected to the driving electrode of the second driving time.

11. A display device, comprising:

at least two touch panels having first electrodes formed in a first direction, second electrodes formed in a second direction, and driving lines and pre-charge lines connected to respective first electrodes; and at least two touch IC units provided at the at least two touch panels, respectively, to operate independently and configured so that, when applying a driving signal to a first electrode chosen from first electrodes formed on a corresponding touch panel, pre-charge signals are simultaneously applied to at least one different first electrode formed on the corresponding touch panel, wherein during a first driving time for touch sensing, each of the at least two touch IC applies the driving signal to a driving line connected to a first electrode chosen as a driving electrode of the first driving time from the first electrodes and simultaneously applies a pre-charge signal to a pre-charge line connected to at least one first electrode chosen as a pre-driving electrode from the other first electrodes except the first electrode chosen as the driving electrode, and during a second driving time for touch sensing, each of the at least two touch IC chooses one of the at least one first electrode chosen as the pre-driving electrode for the first driving time as the driving electrode of the second driving time and applies the driving signal to a driving line connected to the driving electrode of the second driving time.

\* \* \* \* \*